S. FRIEND.
Fly-Traps.
No. 133,579. Patented Dec. 3, 1872.
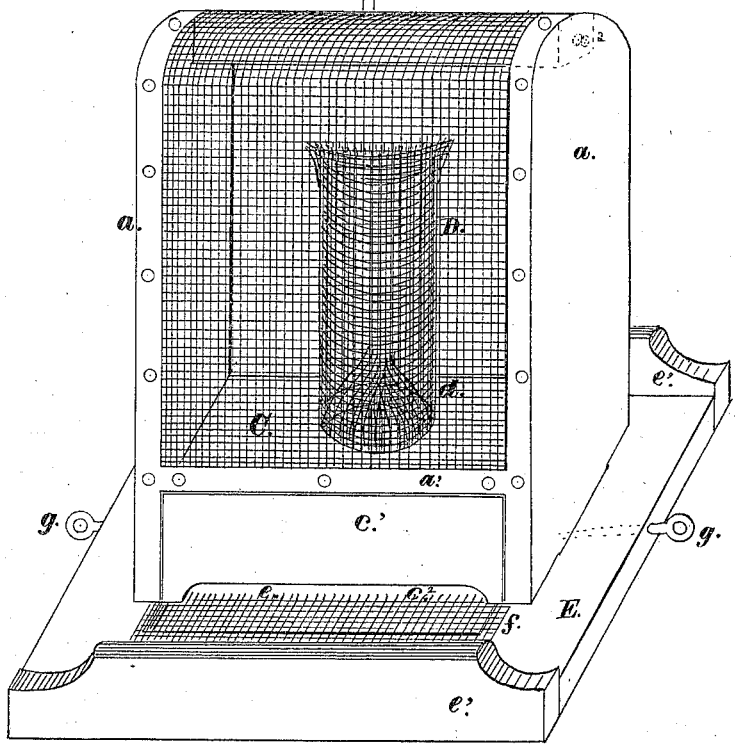
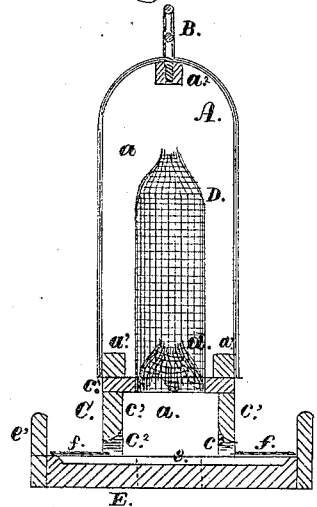
WITNESSES:
INVENTOR:
Samuel Friend.
per Charles P. Housum
HIS ATTORNEY.

UNITED STATES PATENT OFFICE.

SAMUEL FRIEND, OF DECATUR, ILLINOIS.

IMPROVEMENT IN FLY-TRAPS.

Specification forming part of Letters Patent No. 133,579, dated December 3, 1872.

*To all whom it may concern:*

Be it known that I, SAMUEL FRIEND, of Decatur, in the county of Macon and State of Illinois, have invented certain Improvements in Fly-Traps, of which the following is a specification:

My invention relates to an improvement in fly-traps; and consists of a combination of devices which form, when complete, a trap for the purpose of catching flies and other insects.

Figure 1 is a perspective view of a fly-trap embodying my invention, and Fig. 2 is a vertical transverse section.

A represents the receiving-chamber, which is constructed of the side pieces $a\ a$ and the cross-pieces $a^1\ a^1$, and to which pieces is fastened fine-wire gauze. B is an eye, fastened to the cross-piece $a^2$, to hang up or carry the trap by. C is a removable or false bottom to the receiving-chamber, and consists of the bottom $c$ with the two cross-pieces $c^1\ c^1$. The bottoms of these pieces are cut out, as shown at $c^2$, as a passage for the flies into the trap. An opening is made in the bottom $c$, in which is fastened the wire-gauze tubes D and $d$, flattened at the top ends but with sufficient openings for the flies to pass through. E is the bottom to the trap, hollowed out, as shown at $e$, as a receptacle for the bait. Pieces of wire-gauze $f f$ are fastened over the edges of the bait-receptacle. Strips $e^1\ e^1$ are fastened to the side of the bottom of the trap to darken the openings $c^2\ c^2$. The side pieces $a\ a$ are tenoned, and a mortise cut in the bottom E, they being secured together with the pins $g\ g$. The false bottom is held between these two parts of the trap.

The trap is operated as follows, viz: The flies, being attracted by a suitable bait, pass in through the openings $c^2\ c^2$, and, in attempting to return, they will pass under the wire-gauze $f f$, and failing to get out will pass up through the tubes $d$ and D into the receiving-chamber, where they are secured. The tube D should be so that it reaches nearly to the top of the receiving-chamber, for as the flies die and drop down it will give more room and not require cleaning so often, as burning or scalding to kill the flies injures the trap.

I claim as my invention—

A fly-trap consisting of the receiving-chamber A, false bottom C with the tubes D and $d$ and openings $c^2\ c^2$, the bottom E with the pieces of wire-gauze $f f$, the receiving-chamber A and bottom E secured with the pins $g\ g$, the whole combined and constructed substantially as described.

SAMUEL FRIEND.

Witnesses:
CHARLES P. HOUSUM,
JACOB I. BEAR.